(12) United States Patent
Brown et al.

(10) Patent No.: US 10,233,806 B2
(45) Date of Patent: Mar. 19, 2019

(54) EXHAUST SYSTEM

(71) Applicant: JOHNSON MATTHEY PUBLIC LIMITED COMPANY, London (GB)

(72) Inventors: Gavin Michael Brown, Royston (GB); Andrew Francis Chiffey, Royston (GB); Paul Richard Phillips, Royston (GB); Jonathan Radcliffe, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/291,143

(22) Filed: Oct. 12, 2016

(65) Prior Publication Data

US 2017/0107878 A1 Apr. 20, 2017

(30) Foreign Application Priority Data

Oct. 15, 2015 (GB) .................. 1518277.7

(51) Int. Cl.
*F01N 3/20* (2006.01)
*F01N 3/08* (2006.01)
(Continued)

(52) U.S. Cl.
CPC ........... *F01N 3/20* (2013.01); *B01D 53/9418* (2013.01); *B01D 53/9422* (2013.01); *B01J 23/005* (2013.01); *B01J 23/10* (2013.01); *B01J 23/40* (2013.01); *B01J 23/44* (2013.01); *B01J 23/464* (2013.01); *B01J 23/63* (2013.01); *B01J 23/74* (2013.01); *B01J 23/83* (2013.01); *B01J 29/7015* (2013.01); *B01J 29/763* (2013.01); *B01J 35/0006* (2013.01); *B01J 35/04* (2013.01); *B01J 37/0244* (2013.01); *B01J 37/0246* (2013.01);
(Continued)

(58) Field of Classification Search
CPC . F01N 3/20; F01N 3/2839; B01J 23/44; B01J 23/464; B01J 29/763
USPC ........................................ 422/171, 177, 180
See application file for complete search history.

(56) References Cited

U.S. PATENT DOCUMENTS

2006/0120937 A1 6/2006 Zuberi
2011/0030346 A1 2/2011 Neubauer et al.
(Continued)

FOREIGN PATENT DOCUMENTS

GB 201416300 * 10/2014 ......... B01D 53/9481
GB 2519403 A 4/2015
(Continued)

*Primary Examiner* — Tom P Duong
(74) *Attorney, Agent, or Firm* — Gary D. Mangels

(57) ABSTRACT

An exhaust system for an internal combustion engine, the exhaust system comprising, a lean $NO_x$ trap, a $NO_x$ storage and reduction zone on a wall flow monolithic substrate having a pre-coated porosity of 50% or greater, the $NO_x$ storage and reduction zone comprising a platinum group metal loaded on one or more first support, the or each first support comprising one or more alkaline earth metal compound, and a selective catalytic reduction zone on a monolithic substrate, the selective catalytic reduction zone comprising copper or iron loaded on a second support, the second support comprising a molecular sieve.

16 Claims, 1 Drawing Sheet

Figure 1:
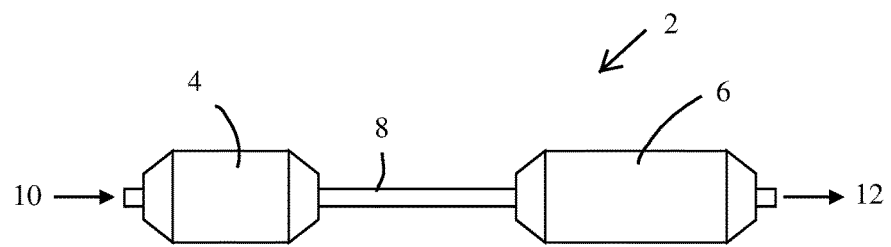

(51) Int. Cl.

| | | |
|---|---|---|
| *F01N 3/28* | (2006.01) | |
| *F01N 3/022* | (2006.01) | |
| *F01N 3/035* | (2006.01) | |
| *F01N 13/00* | (2010.01) | |
| *B01D 53/94* | (2006.01) | |
| *B01J 23/00* | (2006.01) | |
| *B01J 23/10* | (2006.01) | |
| *B01J 23/44* | (2006.01) | |
| *B01J 23/46* | (2006.01) | |
| *B01J 29/76* | (2006.01) | |
| *B01J 35/00* | (2006.01) | |
| *B01J 35/04* | (2006.01) | |
| *B01J 37/02* | (2006.01) | |
| *B01J 23/40* | (2006.01) | |
| *B01J 23/63* | (2006.01) | |
| *B01J 23/74* | (2006.01) | |
| *B01J 23/83* | (2006.01) | |
| *B01J 29/70* | (2006.01) | |

(52) U.S. Cl.
CPC ........ *B01J 37/0248* (2013.01); *F01N 3/0222* (2013.01); *F01N 3/035* (2013.01); *F01N 3/0821* (2013.01); *F01N 3/0842* (2013.01); *F01N 3/2066* (2013.01); *F01N 3/2073* (2013.01); *F01N 3/2828* (2013.01); *F01N 3/2839* (2013.01); *F01N 13/0093* (2014.06); *B01D 2255/1021* (2013.01); *B01D 2255/1023* (2013.01); *B01D 2255/1025* (2013.01); *B01D 2255/2065* (2013.01); *B01D 2255/20761* (2013.01); *B01D 2255/9032* (2013.01); *B01D 2255/91* (2013.01); *B01D 2255/9205* (2013.01); *F01N 2330/06* (2013.01); *F01N 2370/00* (2013.01); *F01N 2370/02* (2013.01); *F01N 2510/068* (2013.01); *F01N 2510/0682* (2013.01); *Y02A 50/2325* (2018.01); *Y02T 10/24* (2013.01)

(56) References Cited

U.S. PATENT DOCUMENTS

| | | | |
|---|---|---|---|
| 2011/0173950 A1* | 7/2011 | Wan | B01D 53/9472 60/274 |
| 2013/0149221 A1* | 6/2013 | Blakeman | B01J 35/0006 423/213.5 |
| 2013/0149223 A1 | 6/2013 | Blakeman et al. | |
| 2015/0037233 A1 | 2/2015 | Fedeyko et al. | |

FOREIGN PATENT DOCUMENTS

| | | |
|---|---|---|
| JP | H08281106 A | 10/1996 |
| JP | H09141106 A | 6/1997 |
| WO | 2005014146 A1 | 2/2005 |
| WO | 2010004320 A2 | 1/2010 |
| WO | 2012175948 A1 | 12/2012 |
| WO | 2013088128 A1 | 6/2013 |
| WO | 2014080220 A1 | 5/2014 |
| WO | 2015036797 A1 | 3/2015 |

* cited by examiner

EXHAUST SYSTEM

CROSS-REFERENCE TO RELATED APPLICATIONS

This application claims priority to Great Britain Application No. 1518277.7, filed Oct. 15, 2015, which is incorporated herein by reference.

The present invention relates to exhaust systems for internal combustion engines, preferably compression ignition (Diesel) engines, to catalysed substrates for use in such exhaust systems, to methods of making such catalysed substrates and to methods of treating exhaust gases.

Internal combustion engines are a potential source of pollutants including $NO_x$, carbon monoxide, particulates, hydrocarbons, hydrogen sulphide and ammonia.

Increasingly strict environmental regulations have been enacted in economies such as the European Union and the USA and throughout the world to reduce the emission of pollutants into the atmosphere from various sources, in particular, internal combustion (IC) engines. There have been a number of solutions proposed to the problem of reducing emissions from IC engines.

WO-A-2014/080220 discloses a zoned catalyst on a monolithic substrate for controlling hydrogen sulphide gas formed in a lean $NO_x$ trap during desulfation.

WO-A-2010/004320 and WO-A-2012/175948 each disclose an exhaust system for an internal combustion engine for treating a range of pollutants.

WO-A-2013/088128 discloses an exhaust system for an internal combustion engine comprising a platinum-containing catalyst in a first washcoat coating disposed on a substrate monolith, which platinum-containing catalyst is liable to volatilise in high temperatures disposed upstream of a catalyst for selectively catalysing the reduction of oxides of nitrogen to dinitrogen with a nitrogenous reductant.

WO-A-2005/014146 discloses a catalyst arrangement using a single monolith and a method of purifying the exhaust gas of internal combustion engines operated under lean conditions.

Pollutants of major concern are nitrogen oxides ($NO_x$) which are produced, for example, when nitrogen in the air reacts with oxygen within an IC engine. Such nitrogen oxides may include nitrogen monoxide and/or nitrogen dioxide.

One catalytic method to reduce $NO_x$ emissions is the lean $NO_x$ trap which efficiently converts $NO_x$ from an internal combustion engine to nitrogen, although some exhaust gas $NO_x$ may slip through as the trap becomes saturated. Some by-products may also be produced by a lean $NO_x$ trap, for example, non-selective reduction pathways may result in the production of ammonia. Lean $NO_x$ traps are sometimes referred to in the art as $NO_x$ traps, $NO_x$ adsorber catalysts (NACs) $NO_x$ sorber catalysts (NSC). Such terms are used interchangeably herein, provided the function is to adsorb $NO_x$ from lean (lambda>1) exhaust gas and to desorb and reduce $NO_x$ from stoichiometric or rich exhaust gas (lambda=1 or lambda<1 respectively).

In addition, a number of selective catalytic reduction (SCR) methods have been developed in an attempt to reduce $NO_x$ emissions by converting $NO_x$ to nitrogen and water. Active SCR uses a reductant (for example, a nitrogenous reductant such as ammonia or an ammonia precursor, e.g. urea) which is added to a stream of exhaust gas and adsorbed on to a catalyst.

WO-A-2015/036797 discloses an exhaust system using active selective catalytic reduction for treating an exhaust gas from an internal combustion engine and a method for treating such exhaust gas.

In the presence of the nitrogenous reductant and the SCR catalyst, a number of reactions occur, with the result that $NO_x$ is converted to elemental nitrogen and water. Such a system is very effective at reducing $NO_x$ emissions but increases complexity of exhaust systems.

Passive SCR requires no separate system to add reductant to the exhaust gas stream and may use a lean $NO_x$ adsorber trap (LNT) to generate ammonia in situ and a downstream selective catalytic reduction catalyst. When the exhaust gas is produced in engine lean running conditions (relatively low fuel/oxygen ratio), $NO_x$ is adsorbed on the LNT. The LNT is regenerated by contacting it intermittently with enriched (relatively high fuel/oxygen ratio) exhaust gas (produced under the control of engine management systems). Such enrichment promotes desorption of adsorbed $NO_x$ and reduction of NOx on a reduction catalyst present in the LNT. The enriched exhaust gas also generates ammonia ($NH_3$) from $NO_x$ on the LNT, which may become adsorbed on the SCR catalyst downstream and is available for reduction of $NO_x$ that slips past the LNT in lean (lambda>1) exhaust gas conditions. The efficiency of the SCR catalyst is dependent on the $NO_2$/NOx ratio and on temperature.

Nevertheless, as new regulations reduce the allowable level of $NO_x$ emissions from IC engines, there is a continuing need to provide exhaust systems that reduce $NO_x$ emission efficiently, effectively and cheaply.

It is an aim of the present invention to address this issue.

The present invention accordingly provides, in a first aspect, an exhaust system for an internal combustion engine, the exhaust system comprising, a lean $NO_x$ trap, a $NO_x$ storage and reduction zone on a wall flow monolithic substrate having a pre-coated porosity of 50% or greater, the $NO_x$ storage and reduction zone comprising a platinum group metal loaded on one or more first support, the or each first support comprising one or more alkaline earth metal compound, and a selective catalytic reduction zone on a monolithic substrate, the selective catalytic reduction zone comprising copper or iron loaded on a second support, the second support comprising a molecular sieve, preferably an aluminosilicate zeolite.

The present invention is active for treating unburned hydrocarbons, carbon monoxide, particulate matter, oxides of nitrogen, hydrogen sulphide and ammonia ($NH_3$), which may be present individually or in some combination during the duty cycle of an upstream lean $NO_x$ trap (LNT).

This is greatly advantageous, because such a system allows high conversion of $NO_x$ produced by an IC engine including $NO_x$ slipped from the lean $NO_x$ trap, but also reduces other emissions such as particulates, CO and hydrocarbons. In particular the relatively high porosity of the wall flow monolithic substrate enables effective catalytic activity even with more challenging recent drive test cycles for IC engines in vehicles.

The $NO_x$ storage and reduction zone may be on a first (wall flow) monolithic substrate (also referred to herein as a "wall-flow filter") and the selective catalytic reduction zone may be on a second (wall flow or flow through) monolithic substrate. Thus, there may be two separate monolithic substrates downstream of the lean $NO_x$ trap. This is advantageous because it effectively reduces $NO_x$ emissions.

Preferably, the $NO_x$ storage and reduction zone and the selective catalytic reduction zone may each be on portions of the same monolithic substrate, i.e. the wall flow monolithic substrate. Most preferably, the arrangement is that the $NO_x$ storage and reduction zone is obtained by coating open channels of the wall flow substrate monolith from a first end thereof and the selective catalytic reduction zone is obtained by coating open channels of the wall flow substrate monolith from a second end thereof. This is particularly advantageous where there is restricted space in an exhaust system e.g. of a vehicle and allows compact and less complex systems to be provided.

Preferably, where the two zones are on the same wall flow monolithic substrate, the $NO_x$ storage and reduction zone extends over between 10% and 90% of the axial length of the monolithic substrate and the selective catalytic reduction zone extends over between 90% and 10% of the axial length of the monolithic substrate. More preferably, the $NO_x$ storage and reduction zone extends over the same, or even more preferably, a greater portion of the axial length of the monolithic substrate than the selective catalytic reduction zone. The $NO_x$ storage and reduction zone may extend over between 40% and 90% of the axial length of the monolithic substrate and the selective catalytic reduction zone may extend over between 60% and 10% of the axial length of the monolithic substrate.

There may be a gap (over the axial length of the monolithic substrate) between the end of the $NO_x$ storage and reduction zone and the start of the selective catalytic reduction zone.

Preferably, however, there is an overlap (over the axial length of the monolithic substrate) between the zones. A small overlap is advantageous because it decreases $N_2O$ generation and limits the level of poisoning, e.g. from fuel or lubricant additives such as phosphorus, sulfur and alkali metals, and thus $NO_x$ slipped by the catalyst. Preferably, the axial length of the $NO_x$ storage and reduction zone and the axial length of the selective catalytic reduction zone may overlap by 20% or less, more preferably 15% or less, of the total axial length of the monolithic substrate. Higher amounts of overlap may result in a reduction in catalytic conversion.

A great advantage of the use of a wall flow monolithic substrate is that the substrate acts as a filter substrate reducing particulate emissions very effectively. A wall flow monolithic substrate usually comprises an inlet end, an outlet end, with an axial length extending between the inlet end and the outlet end, and a plurality of channels defined by internal walls of the wall flow substrate. The channels of the wall-flow filter are alternately blocked from either the inlet or outlet end so that the channels comprise inlet channels having an open inlet end and a closed outlet end and outlet channels having a closed inlet end and open outlet end. This ensures that the exhaust gas stream enters a channel from the inlet end, flows through the porous channel walls, and exits the filter from a different channel leading to the outlet end. Particulates in the exhaust gas stream are effectively trapped in the filter.

Preferably, the pre-coated porosity of the wall flow monolithic substrate is 52% or greater, preferably 55% or greater, more preferably 60% or greater and most preferably 62% or greater. This is advantageous because such relatively high porosities enable good exhaust gas flow through the channel walls in the monolithic substrate effectively enhancing the interaction between the $NO_x$ storage and reduction zone and the selective catalytic reduction zone thereby improving overall $NO_x$ conversion but without increasing back pressure unacceptably.

It is preferred that the pores of the wall flow monolithic substrate have a diameter (mean pore size (MPS)) in the range 12 µm to 25 µm. This range of pore diameter is suitable for washcoat coating by which the catalysts and supports may be applied to the walls of the channels, enabling a relatively high surface area for catalytic activity without increasing back pressure unacceptably. MPS may be determined by mercury porosimetry.

The $NO_x$ storage and reduction zone is usually present on the inlet channels of the inlet end of the wall flow monolithic substrate and the selective catalytic reduction zone is present on the outlet channels of the outlet end of the wall flow monolithic substrate. This orientation is preferable especially in higher temperature exhaust systems because it is advantageous for the SCR zone to be in the cooler location relative to the $NO_x$ storage and reduction zone to reduce ammonia slip.

The selective catalytic reduction zone may however be present on the inlet channels of the inlet end of the wall flow monolithic substrate and the $NO_x$ storage and reduction zone on the outlet channels of the outlet end of the wall flow monolithic substrate. Surprisingly, this orientation (with the SCR zone upstream) is also effective if the temperature window of operation of the SCR zone is not too high (which may lead to an increase in ammonia slip).

The first support preferably comprises one or more particulate inorganic oxides. Examples that may be suitable include spinels, alumina, ceria, ceria-zirconia, silica-alumina, titania, zirconia, alumina-zirconia, and combinations thereof. A preferred inorganic oxide comprises an aluminate, preferably an alkaline earth metal aluminate, most preferably magnesium aluminate, which is an alkaline earth metal compound according to the invention. Preferably, the particulate first support further comprises a cerium compound, preferably cerium oxide or a mixed oxide of cerium and zirconium. The cerium compound is preferably provided by impregnating the particulate first support with a suitable cerium salt and drying and calcining the product. The particulate first support may comprise ceria-zirconia mixed oxide which are generally more thermally durable than ceria alone.

It is preferred that the first support comprises substantially no manganese. By substantially no manganese is meant 0.1 wt % or less preferably 0.05 wt % or less. It is also preferred that the first support comprises substantially no zinc. By substantially no zinc is meant 0.1 wt % or less preferably 0.05 wt % or less.

The alkaline earth metal compound of the first support according to the invention can also comprise preferably an oxide, carbonate and/or hydroxide of barium, strontium, calcium or magnesium or a mixture of any two or more of these compounds. Most preferably, the alkaline earth metal compound is in the form of an oxide or oxides. Although the alkaline earth metal compound may be present as an oxide during preparation of the catalyst, in the presence of air or lean engine exhaust gas some or most of the alkaline earth metal compound, for example barium, may be in the form of the carbonate or possibly the hydroxide. If present as an oxide, carbonate and/or hydroxide, the alkaline earth metal, e.g. barium, loading may be at least 150 $g/ft^3$. The first support can comprise more than one alkaline earth metal compound. For example, preferably the first support comprises magnesium aluminate, which in turn supports the oxide, carbonate and/or hydroxide of barium, strontium, calcium or magnesium or a mixture of any two or more of these compounds.

Preferably, the $NO_x$ storage and reduction zone comprises more than one first support comprising the alkaline earth metal compound. For example, a first, first support may be in the form of magnesium-containing alumina, for example a Mg-doped alumina comprising ceria and, optionally, a barium alkaline earth metal compound. More preferably, the alkaline earth metal compound may be contained in an Mg-doped alumina coated with ceria (derived from a soluble cerium source e.g. a cerium salt and so comprising nano-size ceria crystals supported on the Mg-doped alumina). A second, first support may comprise ceria and barium (in the form of particulate ceria or ceria-zirconia and an alkaline earth metal compound, e.g. an oxide, carbonate and/or hydroxide of barium, strontium, calcium or magnesium or a mixture of any two or more of these compounds, preferably barium loaded on the ceria e.g. impregnated from a barium salt).

The Mg-doped alumina may have varying ratios of Mg and alumina, and/or may include magnesium in the form of a magnesium-aluminate composition or compound, for example, a magnesium aluminium spinel.

Preferably, the molecular sieve is an aluminosilicate zeolite, which may be selected from a beta zeolite (BEA), a faujasite (FAU) (such as an X-zeolite or a Y-zeolite, including NaY and USY), an L-zeolite, a chabazite, a ZSM zeolite (e.g., ZSM-5 (MFI), ZSM-48 (MRE)), a so-called small pore molecular sieve having a maximum pore opening of eight tetrahedral atoms, preferably CHA, ERI or AEI, an SSZ-zeolite (e.g., SSZ-13 (a CHA), SSZ-41, SSZ-33, SSZ-39), a ferrierite (FER), a mordenite (MOR), an offretite (OFF), a clinoptilolite (HEU), a silicalite, or an aluminophosphate molecular sieve (including metalloaluminophosphates) such as SAPO-34 (a CHA), a mesoporous zeolite (e.g., MCM-41, MCM-49, SBA-15), or mixtures of any two or more thereof; more preferably, the zeolite is a beta zeolite (BEA), a ferrierite (FER), or a small pore molecular sieve selected from CHA, ERI and AEI; most preferably aluminosilicate CHA or AEI.

Preferably, the platinum group metal is platinum, palladium, rhodium, or mixtures of any two or more thereof. The preferred platinum group metal comprises a mixture of platinum and palladium in a Pt:Pd weight ratio greater than 3:1, preferably greater than 4:1 and more preferably 3:1 to 7:1, most preferably 3:1 to 6:1. This has been shown to be an effective catalyst for the $NO_x$ storage and reduction zone. Surprisingly, the platinum group metal may contain 0.05 wt % or less Rh and still be effective even in the $NO_x$ reduction part of the storage and reduction catalytic reaction. Even more preferably the platinum group metal may contain substantially no Rh.

It is preferred if the total platinum group metal loading in the $NO_x$ storage and reduction zone is in the range 5 to 100 $gft^{-3}$, preferably 10 to 50 $gft^{-3}$, more preferably in the range in the range 15 to 40 $gft^{-3}$, more preferably in the range 15 to 35 $gft^{-3}$, and most preferably in the range 15 to 30 $gft^{-3}$.

Usually, the exhaust system will not comprise a nitrogenous reductant or a precursor thereof (e.g. urea and/or ammonia) injection system which is advantageous because such injection systems may increase the cost and complexity of the system.

The washcoat loading of the $NO_x$ storage and reduction zone may be in the range 0.5 to 3.0 $g/in^3$, such as 0.8 to 2.0 $g/in^3$.

The washcoat loading of the selective catalytic zone may be in the range 0.5 to 3.0 $g/in^3$, preferably 0.8 to 2.0 $g/in^3$ or 0.2 $g/in^3$ to 1.6 $g/in^3$ (based on Cu or Fe). Cu is preferred in the selective catalytic zone.

In the first aspect of the invention there is provided a wall flow monolithic substrate with a $NO_x$ storage and reduction zone; and a selective catalytic zone.

Thus, the present invention accordingly provides, in a second aspect, a catalytic wall flow monolithic substrate having a pre-coated porosity of 50% or greater, the substrate comprising a $NO_x$ storage and reduction zone, the $NO_x$ storage and reduction zone comprising a platinum group metal loaded on one or more first support, the first support comprising one or more alkaline earth metal compound, and a selective catalytic reduction zone, the selective catalytic reduction zone comprising copper or iron loaded on a second support, the second support comprising a molecular sieve, preferably an aluminosilicate zeolite.

The optional and preferred features of the second aspect of the invention correspond to those optional and preferred features of the first aspect.

Usually, the zones may be deposited on the substrate using washcoat procedures. A general process for preparing the monolith substrate using a washcoat procedure is set out below. The order of addition of the first e.g. $NO_x$ storage and reduction zone and the second e.g. selective catalytic reduction zone onto the substrate is not considered critical. Thus, the first zone can be washcoated on the substrate prior to washcoating the second zone or the second zone can be washcoated on the substrate prior to washcoating the first zone.

Washcoating is preferably performed by slurrying (e.g. in water) solid particles making up the support so that they have a particle size of less than 20 microns in an average diameter. The slurry preferably contains between 4 to 40 weight percent solids, more preferably between 6 to 30 weight percent solids. Additional components, such as stabilizers or promoters may also be incorporated in the slurry as a mixture of water soluble or water-dispersible compounds or complexes. The substrate may then be coated one or more times with the slurry such that there will be deposited on the substrate the desired loading of catalytic materials.

The platinum group metal may be added to the support-coated substrate monolith by any known means, including impregnation, adsorption, or ion-exchange of a platinum compound (such as platinum nitrate), but is conveniently added to the washcoat slurry as a soluble platinum group metal salt or salts. Base metals (e.g. Cu or Fe) may be conveniently added to the washcoat slurry as a soluble metal salt or salts (e.g. copper nitrate).

Thus, in a third aspect, the present invention provides, a method of making a catalysed monolithic substrate, the method comprising, providing a wall flow monolithic substrate having a pre-coated porosity of 50% or greater, preparing a $NO_x$ storage and reduction zone washcoat comprising a source of a platinum group metal and an alkaline earth metal compound, applying the $NO_x$ storage and reduction zone washcoat to a first portion of the monolithic substrate, preparing a selective catalytic reduction zone washcoat comprising a molecular sieve, preferably an aluminosilicate zeolite, and a source of copper or a source of iron, and applying the selective catalytic reduction zone washcoat to a second portion of the monolithic substrate.

In a fourth aspect, the present invention provides a method of treating exhaust gases from an internal combustion engine, the method comprising flowing the exhaust gas through an exhaust system as in the first aspect, wherein the exhaust gas comprises a lean exhaust gas intermittently becoming rich. The terms "lean" and "rich" are relative to the stoichiometric point of fuel combustion in the engine, i.e. the air to fuel ratio by weight that combusts the fuel perfectly as hydrocarbon plus oxygen to carbon dioxide and water. Lean exhaust gases are formed where oxidising species ($O_2$ and NO$_x$) are in excess relative to this stoichiometric point, rich exhaust gases are formed wherein the reducing species (unburned hydrocarbons and carbon monoxide) is in excess of the stoichiometric point. The composition of the exhaust gas can also be referred to by reference to an output ("lambda") of an oxygen sensor. A lambda value of 1 is a product of stoichiometric combustion; a lambda value of >1 is a product of lean combustion (relative to the stoichiometric air/fuel ratio); and a lambda value of <1 is a product of rich combustion (relative to the stoichiometric air/fuel ratio).

The above and other characteristics, features and advantages of the present invention will become apparent from the following detailed description, taken in conjunction with the accompanying drawings and the Examples, which illustrate, by way of example, the principles of the invention.

Reference throughout this specification to "an aspect" means that a particular feature, structure or characteristic described in connection with the aspect is included in at least one aspect of the present invention. Thus, appearances of the phrase "in an aspect" in various places throughout this specification are not necessarily all referring to the same aspect, but may refer to different aspects. Furthermore, the particular features, structures or characteristics of any aspect of the invention may be combined in any suitable manner, as would be apparent to one of ordinary skill in the art from this disclosure, in one or more aspects.

In the description provided herein, numerous specific details are set forth. However, it is understood that the invention may be practised without these specific details. In other instances, well-known methods, structures and techniques have not been shown in detail in order not to obscure an understanding of this description.

Figure 2:
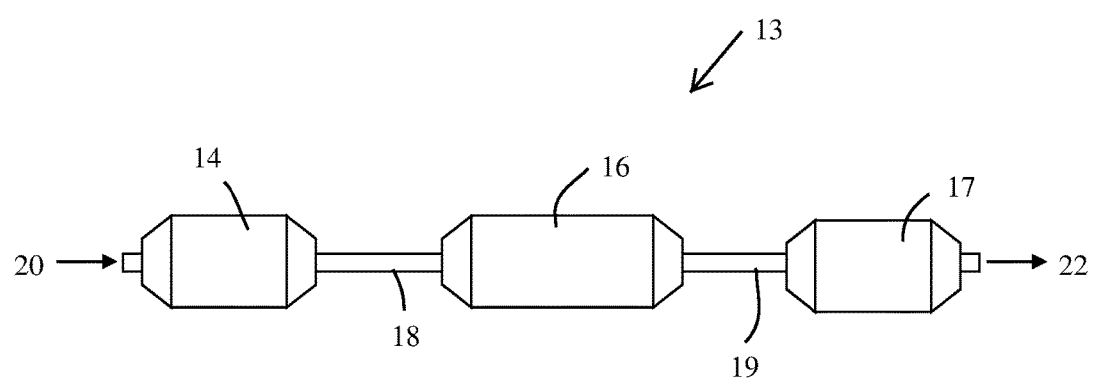

In order that the present invention may be better understood, reference is made to accompanying drawings, in which:

FIG. 1 illustrates schematically a first exhaust system according to the present invention, and FIG. 2 illustrates schematically a second exhaust system according to the present invention.

FIG. 1 shows schematically a first exhaust system 2 of the present invention. The exhaust system 2 comprises a first monolithic substrate 4 which forms a lean NO$_x$ trap (LNT) catalyst. The exhaust gases from the engine (not shown) upstream of the first monolithic substrate/lean NO$_x$ trap 4 enter the first monolithic substrate 4 through inlet 10 and exit the first monolithic substrate 4 through pipe 8. The exhaust gases then enter a second monolithic substrate 6 before exiting through outlet 12. Downstream of outlet 12 there may be other catalytic zones or the exhaust gases may be released to atmosphere.

The second monolithic substrate 6 is a filter, in particular a wall flow monolith substrate having a honeycomb structure with many small, parallel thin-walled channels running axially through the substrate, with the channels of the wall flow substrate being alternately blocked, which allows the exhaust gas stream to enter a channel from the inlet, then flow through the porous channel walls, and exit the filter from a different channel leading to the outlet. The second monolithic substrate 6 contains two zones, a NO$_x$ storage and reduction (NSC) zone of a platinum group metal and a first, first support of a Mg-doped alumina coated with ceria (derived from a soluble cerium source e.g. a cerium salt and so comprising nano-size ceria crystals supported on the Mg-doped alumina) and a second, first support of ceria and barium (in the form of particulate ceria supporting a barium compound e.g. impregnated from a soluble barium salt) provided on and/or within the walls of the inlet channels at the inlet end of the second monolithic substrate 6 and a selective catalytic reduction (SCR) zone provided on and/or within the walls of the outlet channels at the outlet end of the second monolithic substrate 6. The exhaust system of FIG. 1 may be formed as described below in the Examples.

FIG. 2 shows schematically a second exhaust system 13 of the present invention. The exhaust system 13 comprises a first monolithic substrate 14 which forms a lean NO$_x$ trap catalyst. As in FIG. 1, the exhaust gases from the engine (not shown) upstream of the first monolithic substrate/lean NO$_x$ trap 14 enter the first monolithic substrate 14 through inlet 20 and exit the first monolithic substrate 14 through pipe 18. The exhaust gases then enter a second monolithic substrate 16 before exiting through pipe 19 to a third monolithic substrate 17 and then through outlet 22. Downstream of outlet 22 there may be other catalytic zones or the exhaust gases may be released to atmosphere.

The second monolithic substrate 16 is a filter, wall flow monolithic substrate having a NO$_x$ storage and reduction zone provided on the walls of the channels. The third monolithic substrate 17 is a flow through monolithic substrate having a uniform coating throughout of a selective catalytic reduction zone.

The following Examples are provided by way of illustration only.

EXAMPLE 1

A standard lean NO$_x$ trap (LNT) catalyst was prepared on a 1.4 liter volume ceramic substrate having 400 cells per square inch. The catalyst had a total PGM loading of 118 g ft$^{-3}$ and a Pt:Pd:Rh weight ratio of 94:19:5.

EXAMPLE 2

Preparation of PGM/NOx Storage and Reduction Catalytic Zone (NSC) Coating

Ce/magnesium-aluminate spinel was slurried in water and milled to d90 of less than 10 micron. Soluble salts of Pt and Pd were added followed by cerium oxide and barium acetate. The slurry was stirred to homogenise and applied to the inlet channels of a 3.0 liter volume SiC wall-flow filter substrate having 300 cells per square inch, a wall thickness of 12.5 Mil (thousands of an inch) and 63% porosity. The coating was dried using forced air flow. The coating depth was 55% of the total substrate length when measured from the inlet side.

Preparation of 3 wt % Cu/CHA Zeolite Coating as Passive Selective Catalytic Reduction (SCR) Catalyst Commercially available aluminosilicate CHA zeolite (a chabazite) was added to an aqueous solution of Cu(NO$_3$)$_2$ with stirring. The slurry was filtered, then washed and dried. The procedure can be repeated to achieve a desired metal loading. The final product was calcined. After mixing, binders and rheology modifiers were added to form a washcoat composition. This washcoat was applied to the outlet end of the SiC filter substrate. It was then dried and calcined at 500° C. The coating depth was 55% of the total substrate length when measured from the outlet side.

The finished catalyst coating on the filter had a Pt:Pd weight ratio of 5:1 and total PGM loading of 24 g ft$^{-3}$.

EXAMPLE 3

Ce/magnesium-aluminate spinel was slurried in water and milled to d90 of less than 10 micron. Soluble salts of Pt and Pd were added followed by cerium oxide and barium acetate. The slurry was stirred to homogenise and applied to the entire volume of a 3.0 liter volume SiC wall-flow filter substrate having 300 cells per square inch, a wall thickness of 12.5 Mil (thousands of an inch) and 63% porosity. The coating was dried using forced air flow and calcined at 500° C.

The finished catalyst coating on the filter had a Pt:Pd weight ratio of 5:1 and total PGM loading of 48 g ft$^{-3}$.

EXAMPLE 4

Commercially available aluminosilicate CHA zeolite (a chabazite) was added to an aqueous solution of Cu(NO$_3$)$_2$ with stirring. The slurry was filtered, then washed and dried. The procedure can be repeated to achieve a desired metal loading. The final product was calcined. After mixing, binders and rheology modifiers were added to form a washcoat composition. This washcoat was applied to a 1.25 liter volume ceramic flow through substrate having 350 cells per square inch. The coating was dried and calcined at 500° C.

Engine Testing

The catalyst from Example 1 was hydrothermally aged at 800° C. for 5 hours. The catalysts from Example 2 and Example 3 were hydrothermally aged at 800° C. for 16 hours. The catalyst from Example 4 was hydrothermally aged at 750° C. for 24 hours. The aged catalysts of Examples 1, 2, 3 and 4 were tested on a 1.6 liter engine employing low pressure exhaust gas recirculation, running simulated Common ARTEMIS (Assessment and Reliability of Transport Emissions Models and Inventory Systems) Driving Cycles (CADC). The engine was enabled to run rich purges at fixed points over the cycle. A total of 12 rich purges were performed over the complete cycle. The % NO$_x$ conversion over the CADC cycle is shown in Table 1 for Examples 1 and 2. Also included in Table 1 are results for a system of Examples 1, 3 and 4, where the c PGM/NOx storage and reduction coating (NSC) is on Example 3 and the SCR coating is on Example 4 as a separate monolith downstream of the PGM/NOx storage and reduction coating as shown in FIG. 2.

TABLE 1

| NO$_x$ conversion over CADC | |
|---|---|
| System | % NO$_x$ conversion |
| Example 1 | 38 |
| Example 1 and Example 2 | 51 |
| Example 1 + Example 3 + Example 4 | 76 |

The results in Table 1 show that Example 2 provides significant additional NOx conversion when tested in combination with Example 1. Further additional NOx conversion is achieved from the system combining Examples 1, 3 and 4 where the SCR coating is located on a separate monolith downstream of the PGM/NO$_x$ storage and reduction coating.

The invention claimed is:

1. An exhaust system for an internal combustion engine, the exhaust system comprising,
   a. a lean NO$_x$ trap,
   b. a NO$_x$ storage and reduction zone on a wall flow monolithic substrate having a pre-coated porosity of 50% or greater, the NO$_x$ storage and reduction zone comprising a platinum group metal loaded on one or more first support, the or each first support comprising one or more alkaline earth metal compound, and
   c. a selective catalytic reduction zone on a monolithic substrate, the selective catalytic reduction zone comprising copper or iron loaded on a second support, the second support comprising a molecular sieve;
   wherein the NO$_x$ storage and reduction zone and the selective catalytic reduction zone are each on portions of the same wall flow monolithic substrate;
   wherein the NO$_x$ storage and reduction zone is disposed in channels of the wall flow monolithic substrate from one end thereof and the selective catalytic reduction zone is disposed in channels of the wall flow monolithic substrate from the other end thereof;
   wherein the NO$_x$ storage and reduction zone extends over between 10% and 90% of the axial length of the monolithic substrate and the selective catalytic reduction zone extends over between 90% and 10% of the axial length of the monolithic substrate; and
   wherein an axial length of the NO$_x$ storage and reduction zone and an axial length of the selective catalytic reduction zone overlap by 20% or less of a total axial length of the monolithic substrate.

2. An exhaust system according to claim 1, wherein the NOx storage and reduction zone is on a first wall flow monolithic substrate and the selective catalytic reduction zone is on a second monolithic substrate.

3. An exhaust system according to claim 1, wherein the pre-coated porosity of the wall flow monolithic substrate is 52% or greater.

4. An exhaust system according to claim 1, wherein the pores of the wall flow monolithic substrate have a diameter in the range 12 μm to 25 μm.

5. An exhaust system according to claim 1, wherein the NO$_x$ storage and reduction zone is on and/or within the walls of the inlet channels of the inlet end of the monolithic substrate and the selective catalytic reduction zone is on and/or within the walls of the outlet channels of the outlet end of the monolithic substrate.

6. An exhaust system according to claim 1, wherein the or each first support comprises a cerium compound.

7. An exhaust system according to claim 1, wherein the or each alkaline earth metal compound comprises an oxide, carbonate and/or hydroxide of magnesium, calcium, strontium or barium or a mixture of any two or more of these compounds.

8. An exhaust system according to claim 1, wherein the molecular sieve is selected from a beta zeolite (BEA), a faujasite (FAU), an L-zeolite, a chabazite, a ZSM zeolite, a small pore molecular sieve having a maximum pore opening of eight tetrahedral atoms, an SSZ-zeolite, a ferrierite (FER), a mordenite (MOR), an offretite (OFF), a clinoptilolite (HEU), a silicalite, an aluminophosphate molecular sieve, a mesoporous zeolite, or mixtures of any two or more thereof.

9. An exhaust system according to claim 1, wherein the platinum group metal is platinum, palladium, rhodium, or mixtures of any two or more thereof.

10. An exhaust system according to claim 9, wherein the platinum group metal comprises a mixture of platinum and palladium in a Pt:Pd weight ratio in the range 2:1 to 7:1.

11. An exhaust system according to claim 1 wherein the platinum group metal contains substantially no Rh.

12. An exhaust system according to claim 1, wherein the NO$_x$ storage and reduction zone is upstream of the selective catalytic zone.

13. A method of treating exhaust gases from an internal combustion engine, the method comprising flowing the exhaust gas through an exhaust system according to claim 1, wherein the exhaust gas comprises a lean exhaust gas intermittently becoming rich.

14. A compression ignition engine fitted with an exhaust system according to claim 1.

15. A vehicle comprising a compression ignition engine and an exhaust system according to claim 14.

16. A method of making a catalysed monolithic substrate, the method comprising:
- a. providing a wall flow monolithic substrate having a pre-coated porosity of 50% or greater,
- b. preparing a $NO_x$ storage and reduction zone washcoat comprising a source of a platinum group metal and an alkaline earth metal compound,
- c. applying the $NO_x$ storage and reduction zone washcoat to a first portion of the monolithic substrate,
- d. preparing a selective catalytic reduction zone washcoat comprising a molecular sieve and a source of copper or a source of iron, and
- e. applying the selective catalytic reduction zone washcoat to a second portion of the monolithic substrate, wherein the $NO_x$ storage and reduction zone and the selective catalytic reduction zone are each on portions of the same wall flow monolithic substrate;

wherein the $NO_x$ storage and reduction zone is disposed in channels of the wall flow monolithic substrate from one end thereof and the selective catalytic reduction zone is disposed in channels of the wall flow monolithic substrate from the other end thereof;

wherein the $NO_x$ storage and reduction zone extends over between 10% and 90% of the axial length of the monolithic substrate and the selective catalytic reduction zone extends over between 90% and 10% of the axial length of the monolithic substrate; and wherein an axial length of the $NO_x$ storage and reduction zone and an axial length of the selective catalytic reduction zone overlap by 20% or less of a total axial length of the monolithic substrate.

\* \* \* \* \*